Figure 1:
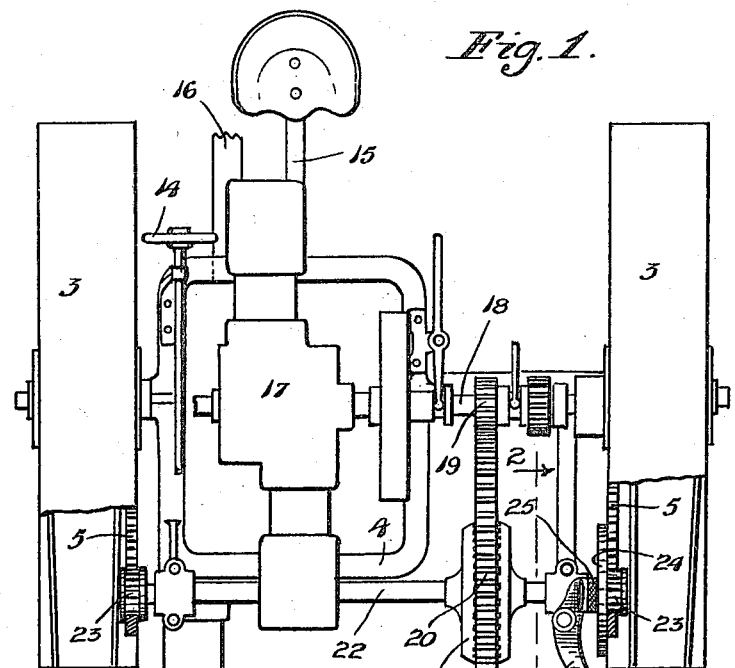

R. B. HARTSOUGH
STEERING MECHANISM FOR TRACTORS.
APPLICATION FILED NOV. 27, 1916.

1,323,051.   Patented Nov. 25, 1919.

Witnesses
H. L. Opsahl
E. C. Wells

Inventor
R. B. Hartsough
By his Attorneys
Williamson & Merchant

UNITED STATES PATENT OFFICE.

RALPH B. HARTSOUGH, OF MINNEAPOLIS, MINNESOTA.

STEERING MECHANISM FOR TRACTORS.

1,323,051.   Specification of Letters Patent.   Patented Nov. 25, 1919.

Application filed November 27, 1916. Serial No. 133,530.

*To all whom it may concern:*

Be it known that I, RALPH B. HARTSOUGH, a citizen of the United States, residing at Minneapolis, in the county of Hennepin and State of Minnesota, have invented certain new and useful Improvements in Steering Mechanism for Tractors; and I do hereby declare the following to be a full, clear, and exact description of the invention, such as will enable others skilled in the art to which it appertains to make and use the same.

Particularly, my present invention relates to tractors of the type disclosed and claimed in my pending application S. N. 35,191, filed of date, June 21, 1915, and entitled "Tractor"; and has for its object to improve the steering action of this type of tractor. Generally stated, the invention consists of the novel devices and combinations of devices hereinafter described and defined in the claims.

In tractors of the above type, there are laterally spaced rear traction wheels and a front steering wheel located in line with one of the traction wheels, so that it is adapted to run in the same furrow therewith.

The rear traction wheels are driven from an engine carried by the tractor, through a differential gear mechanism which permits the two traction wheels to rotate at different speeds when traveling a curve or other than a straight line. The draw bar is usually connected to the tractor frame at a point much nearer to the furrow side traction wheel than it is to the land side traction wheel, and it has been found that it is much more difficult to turn the tractor toward the land side than toward the furrow side because of excessive pull on the furrow side of the tractor. To assist in turning the tractor toward the land side, I provide an automatic friction brake which, when set will retard the rotation of the land side of the traction wheel and will cause the driving power to be transmitted with greater force to the furrow side traction wheel, thereby causing the two traction wheels to assist in the turning action toward the land side.

Figure 2:
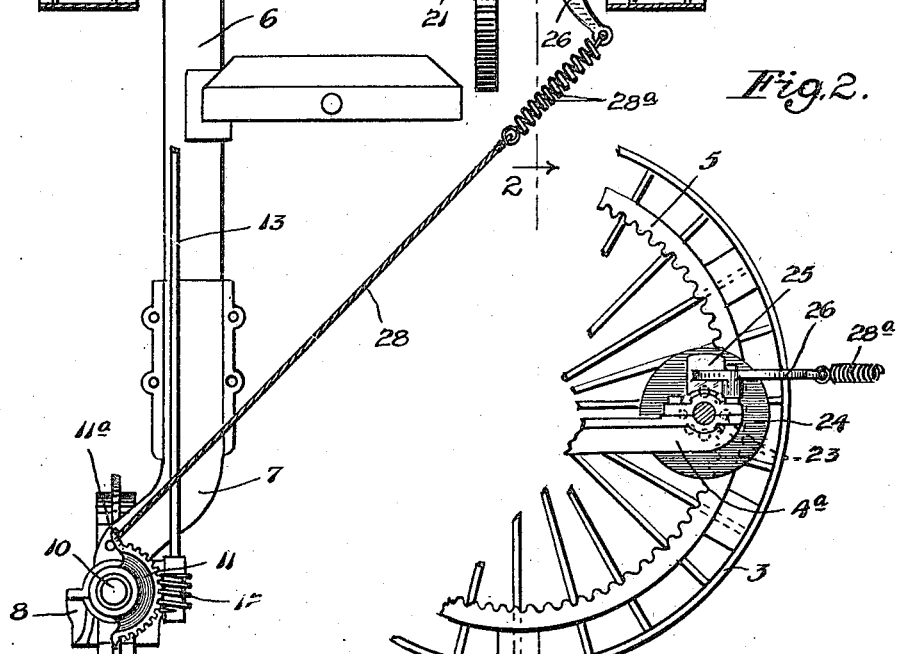

The invention is illustrated in the accompanying drawings wherein like characters indicate like parts throughout the several views. Referring to the drawings:

Figure 1 is a plan view of the tractor with some parts broken away and some parts sectioned; and Fig. 2 is a section on the line 2—2 of Fig. 1, some parts being broken away.

The friction brake may be applied in different ways but a highly efficient manner of applying the same is illustrated in the drawings.

The parts of the tractor, in so far as desirable for the purposes of this case, may be briefly noted as follows: The rear traction wheels 3 are suitably journaled to the main frame 4 of the tractor and are provided with large internal "bull gears" 5. The frame 4 of the one side has a long forwardly projected arm 6 terminating in a head bracket 7 to which the bearing fork 8 of the front steering wheel 9 is connected by an upright pivot shank 10 having a worm gear 11, shown as of segmental form, rigidly secured to its upper extremity. The worm gear 11 is engaged by a worm 12 on the front end of a steering rod 13 mounted in suitable bearings on the head bracket 7 and on the rear portion of the tractor frame 4 and provided at its rear end with a hand wheel 14 located within reach of the operator's seat 15. The numeral 16 indicates a drawbar suitably attached to the tractor frame and, as stated, located much nearer to the furrow side traction wheel than to the land side traction wheel. The numeral 17 indicates an explosive engine mounted on the frame 4 and having its crank shaft 18 journaled in suitable bearings on said main frame and provided with a pinion 19 that meshes with the master wheel 20 of an ordinary differential gear mechanism. This differential gear mechanism has the usual opposing beveled gears 21 connected to the axially alined sections of a divided counter shaft 22 which counter shaft is journaled in suitable bearings on the main frame, and at its ends, has pinions 23 that mesh with the gears 5 of the respective traction wheels.

In the embodiment of the invention illustrated, the land side pinion 23 is provided with a projecting flange in the form of a friction disk or wheel 24. This flange is arranged to be engaged by the brake shoe 25 of a brake lever 26 that is intermediately pivoted to an arm 4ª of the main frame 4, which arm, also affords a bearing for one of the sections of the divided shaft 22. The free end of this brake lever 26 is connected by a cable 28 to a lug or projection 11ª of the worm gear 11. The said cable 28 is made elastic by a stiff coiled spring 28ª.

With the automatic brake mechanism above described, the operation is substantially as follows:

When the guide wheel 9 is moved so as to cause the tractor to turn toward the land side (which, in the tractor illustrated, is toward the driver's left), the cable 28 will pull on the brake lever 26 and will set the brakes so as to frictionally retard the rotation of the land side traction wheel, and this, as before stated in a more general way, will cause greater power to be transmitted to the furrow side traction wheel and thus cause the traction wheels to coöperate in the steering action and make it a comparatively easy matter to turn the tractor toward the land side. The spring 28ª, while it produces sufficient tension on the brake, nevertheless permits further angular movements of the steering wheel 9 after the brake has been set, with the result that the greater the angularity of the steering wheel, the harder the brake will be set.

When the steering wheel 9 is turned in a direction to cause the tractor to turn toward the furrow side (which, in the present instance is toward the driver's right), slack is given to the cable 28 and the friction brake will not be set inasmuch as, even without the brake, it is easy enough to make the tractor turn toward the furrow side.

A frictional device for retarding one of the traction wheels of a tractor, and means for automatically setting or rendering the same frictionally operative by manipulation of the steering mechanism proper, I consider broadly new and desire to claim the same broadly, regardless of the type of tractor to which it is applied. As an illustration of another of the many cases in which it may be applied, it may be stated that in applying the same to a three-wheeled tractor, which, for example, has its front steering wheel located on a line extending centrally between the rear traction wheels, I would preferably apply the frictional retarding device for action on both traction wheels and would combine the same with a duplex arrangement of connections whereby, in turning toward the right, for example, the right hand traction wheel will be frictionally retarded, and in turning toward the left, the left hand traction wheel will be frictionally retarded. The fact that the frictional device is set under a friction that increases with the increasing angle given to the steering wheel is also a highly important feature.

What I claim is:

1. A tractor having laterally spaced rear traction wheels and a single angularly adjustable front guide wheel alined with one of said traction wheels, a motor carried by said tractor, and a differential gear transmission mechanism connecting said motor to said two traction wheels, in combination with a friction brake operative and set to retard the rotation of the traction wheel that is laterally offset from said guide wheel and the traction wheel alined therewith, and a brake connection operative to set said brake when said steering wheel is oscillated in a direction to cause said tractor to turn toward the said brake retarded wheel.

2. A tractor having laterally spaced rear traction wheels and a single angularly adjustable front guide wheel alined with one of said traction wheels, a motor carried by said tractor, and a differential gear transmission mechanism connecting said motor to said two traction wheels, in combination with a friction brake operative and set to retard the rotation of the traction wheel that is laterally offset from said guide wheel and the traction wheel alined therewith, and a brake connection operative to set said brake when said steering wheel is oscillated in a direction to cause said tractor to turn toward the said brake retarded wheel, said brake actuating connection having an automatic element permitting further angular adjustments of said steering wheel after the brake is set.

3. A tractor having laterally spaced rear traction wheels and an angularly adjustable front guide wheel alined with one of said traction wheels, a motor carried by said tractor, and a differential gear transmission mechanism connecting said motor to said two traction wheels, in combination with a friction brake operative to set to retard the rotation of the traction wheel that is laterally offset from said guide wheel and the traction wheel alined therewith, and a brake connection operative to set said brake when said steering wheel is oscillated in a direction to cause said tractor to turn toward the said brake retarded wheel, and a drawbar connected to said tractor and located relatively near to that traction wheel with which said steering wheel is alined.

In testimony whereof I affix my signature in presence of two witnesses.

RALPH B. HARTSOUGH.

Witnesses:
   CLARA DEMAREST,
   F. D. MERCHANT.